United States Patent
Hsieh et al.

(10) Patent No.: US 9,247,034 B2
(45) Date of Patent: Jan. 26, 2016

(54) HEAT DISSIPATION STRUCTURE AND HANDHELD ELECTRONIC DEVICE WITH THE HEAT DISSIPATION STRUCTURE

(71) Applicant: ASIA VITAL COMPONENTS CO., LTD., New Taipei (TW)

(72) Inventors: Kuo-Chun Hsieh, New Taipei (TW); Chuan-Chin Huang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 202 days.

(21) Appl. No.: 13/973,995

(22) Filed: Aug. 22, 2013

(65) Prior Publication Data

US 2015/0055300 A1    Feb. 26, 2015

(51) Int. Cl.
H05K 7/20     (2006.01)
H04M 1/02     (2006.01)
G06F 1/20     (2006.01)

(52) U.S. Cl.
CPC ............. *H04M 1/0202* (2013.01); *G06F 1/20* (2013.01)

(58) Field of Classification Search
None
See application file for complete search history.

(56) References Cited

U.S. PATENT DOCUMENTS

| | | | |
|---|---|---|---|
| 7,755,902 B2* | 7/2010 | Peng et al. | 361/719 |
| 8,385,070 B2* | 2/2013 | Huang et al. | 361/709 |
| 8,659,892 B2* | 2/2014 | Yan et al. | 361/679.52 |
| 8,730,675 B2* | 5/2014 | Sano et al. | 361/710 |
| 8,787,022 B2* | 7/2014 | Moriai et al. | 361/720 |
| 8,873,237 B2* | 10/2014 | Stefanoski | 361/710 |
| 2004/0032710 A1* | 2/2004 | Fujiwara et al. | 361/685 |
| 2006/0126304 A1* | 6/2006 | Smalc et al. | 361/704 |
| 2010/0020497 A1* | 1/2010 | Hayakawa et al. | 361/705 |
| 2014/0334081 A1* | 11/2014 | Pierce et al. | 361/679.3 |

* cited by examiner

*Primary Examiner* — Courtney Smith

(57) ABSTRACT

A heat dissipation structure includes a heat conduction support body disposed in a handheld electronic device. The heat conduction support body has a first face and a second face opposite to the first face. A chamber is defined between the first and second faces. More than one capillary structure and a working fluid are disposed in the chamber. One of the first and second faces or both of the first and second faces are in contact with the electronic components of the handheld electronic device. One of the first and second faces is in contact with the housing of the handheld electronic device. Accordingly, the heat generated by the electronic components can be quickly conducted and dissipated outward.

8 Claims, 8 Drawing Sheets

HEAT DISSIPATION STRUCTURE AND HANDHELD ELECTRONIC DEVICE WITH THE HEAT DISSIPATION STRUCTURE

BACKGROUND OF THE INVENTION

1. Field of the Invention

The present invention relates generally to a heat dissipation structure and a handheld electronic device with the heat dissipation structure, and more particularly to a heat dissipation structure applicable to a handheld electronic device for enhancing the heat dissipation performance thereof.

2. Description of the Related Art

In recent years, along with the rapid development of electronic industries, the operation speed of the electronic components in a handheld mobile device has been continuously enhanced. In operation, the electronic components will generate a great amount of heat to lead to rise of temperature of the electronic components themselves and the entire system. This will affect the stability of the system. In order to ensure normal operation of the electronic components, generally a heat dissipation device is mounted on the electronic components to dissipate the heat generated by the electronic components.

Vapor chamber and heat spreader are the currently hottest materials that are applied to the electronic products for dissipating heat. For example, intelligent mobile phones, tablets, LED lights and car-used LED lights have employed these passive heat dissipation measures. The vapor chamber and heat spreader are chosen for the mobile phones, tablets and LED lights mainly for reasons that the vapor chamber and heat spreader are both passive heat dissipation measures, which will not consume energy. Also, the vapor chamber and heat spreader two-dimensionally conduct heat, that is, they conduct heat on a face without being affected by gravity. Moreover, the vapor chamber and heat spreader are suitable for the lightweight, thin and closed design of the electronic products to achieve very good heat dissipation effect.

The vapor chamber works by principle that is substantially identical to the working principle of the heat pipe, including four main steps of conduction, evaporation, convection and condensation. The vapor chamber is a two-phase fluid device formed of a container over which microstructures are distributed. Pure water is filled in the container. The heat is conducted from an external high-temperature section into the vapor chamber. The water around the point heat source will quickly absorb the heat to evaporate into vapor and carry away a great amount of heat. Due to the latent heat of the vapor, when the vapor in the vapor chamber spreads from the high-pressure section to the low-pressure section, (that is, the low-temperature section), to touch the inner wall of lower temperature, the vapor will quickly condense into liquid to release the heat. The condensed water flows back to the heat source under capillary attraction of the microstructures to complete a heat transfer cycle. Accordingly, a two-phase circulation system of water and vapor exists in the vapor chamber. The water in the vapor chamber continuously evaporates. The pressure in the chamber will keep balanced along with the change of the temperature. In a low-temperature state, the heat conductivity of the water is lower. However, the viscosity of the water will change along with the change of the temperature. Therefore, the vapor chamber is able to operate at 5° C. or 10° C. The liquid flows back by means of capillary attraction so that the affection of gravity to the vapor chamber is relatively small. Accordingly, the system can be designed to be arranged in any angular position. The vapor chamber is a totally passive and closed device free from any power supply or any movable element.

The housing of the vapor chamber needs anodization to avoid oxidization due to contact with air. The anodization will lead to an additional thermal resistant layer, which will deteriorate heat dissipation efficiency. To overcome this problem, the vapor chamber can be coated with soft ceramic heat dissipation paint instead of the anodization. Especially, in the case that the vapor chamber is coated with white soft ceramic heat dissipation paint, the thermal resistance of such heat dissipation paint is nearly down to zero and such heat dissipation paint is able to protect the housing of the vapor chamber from oxidization. Under such circumstance, the vapor chamber can achieve an excellent cooling effect.

In addition, currently, graphite heat spreader is employed as a heat dissipation component. The graphite heat spreader is a nano-complex material for uniformly conducting heat on a surface. The graphite heat spreader has EMI shielding effect and unique grain orientation for bidirectionally uniformly conducting heat. The graphite heat spreader has laminated structure, which is well applicable to any surface.

The chemical composition of the graphite heat spreader is mainly pure carbon element C, which is a natural mineral element. The graphitized film is achievable at high temperature and high pressure by means of chemical method. Carbon element is a nonmetal element. However, it has electro-conductivity and heat conductivity as a metal material. Moreover, carbon element has plasticity similar to organic plastic. In addition, it has many excellent working performances including special thermal performance, chemical stability and lubrication and is applied to the surface of a solid body. The graphite heat spreader has a super-high heat conduction performance within 150-1500 W/mK on a plane (horizontal heat conduction). Furthermore, the vertical thermal conductivity of graphite is only 5-20 W/mK. That is, graphite is nearly thermally isolative in vertical direction. Accordingly, the graphite heat spreader is characterized in that it has a horizontal thermal conductivity much higher than that of other metals and a quite low vertical thermal conductivity.

Also, the graphite heat spreader is mainly characterized by super-high thermal conductivity, easy operation, low thermal resistance and lightweight. Thanks to the plasticity of graphite, the graphite material can be formed into a film like an attachment sheet. The film can be attached onto the circuit board inside a mobile phone to isolate the components from contacting each other and provide a shock absorption effect. The graphite heat spreader has higher horizontal thermal conductivity so that it can quickly conduct heat in horizontal direction to uniformly distribute the heat over the entire surface and eliminate a local hot point. To speak more precisely, the graphite heat spreader is able to conduct heat and uniformly distribute the heat, that is, the graphite heat spreader is able to indirectly dissipate the heat.

However, no matter how light the graphite heat spreader is and no matter how thin the graphite heat spreader is, when the graphite heat spreader is installed in the mobile device, it still inevitably occupies a certain space. Therefore, in order to truly achieve the object of lightweight and thin internal space of the mobile device, it is tried by the applicant to provide a modified heat dissipation structure applicable to the existent mobile phone so as to effectively solve heat dissipation problem thereof.

SUMMARY OF THE INVENTION

It is therefore a primary object of the present invention to provide a heat dissipation structure, which will not increase the thickness of a handheld electronic device and has a thermal conductivity higher than the conventional heat dissipation structure.

It is a further object of the present invention to provide a heat conduction support body in contact with the electronic components in the handheld electronic device for dissipating the heat generated by the electronic components without using any additional heat dissipation component.

It is still a further object of the present invention to provide the above heat conduction support body. The surface of the heat conduction support body is formed with a depression in which the electronic components in the handheld electronic device are correspondingly disposed.

It is still a further object of the present invention to provide the above heat conduction support body, which is in contact with the back face of a display screen for dissipating the heat generated by the display screen.

To achieve the above and other objects, the heat dissipation structure of the present invention is applicable to a handheld electronic device. The handheld electronic device has a housing in which a plurality of electronic components are arranged. The heat dissipation structure includes a heat conduction support body having a first face and a second face opposite to the first face. A chamber is defined between the first and second faces. A capillary structure and a working fluid are disposed in the chamber. One of the first and second faces or both of the first and second faces are in contact with the electronic components of the handheld electronic device.

The handheld electronic device with the heat dissipation structure of the present invention includes: a housing composed of an upper cover and a lower cover, the upper and lower covers defining therebetween a space; a heat conduction support body disposed in the space, the heat conduction support body having a first face and a second face opposite to the first face, a chamber being defined between the first and second faces, a capillary structure and a working fluid being disposed in the chamber; and a plurality of electronic components positioned in the space in contact with one of the first and second faces or both of the first and second faces.

In the above handheld electronic device, at least one depression is formed on one of the first and second faces or both of the first and second faces in contact with the corresponding electronic components. The electronic components are directly arranged on one of the first and second faces or both of the first and second faces. One of the first and second faces is in contact with the housing of the handheld electronic device. The heat conduction support body is a vapor chamber or a thin heat pipe.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
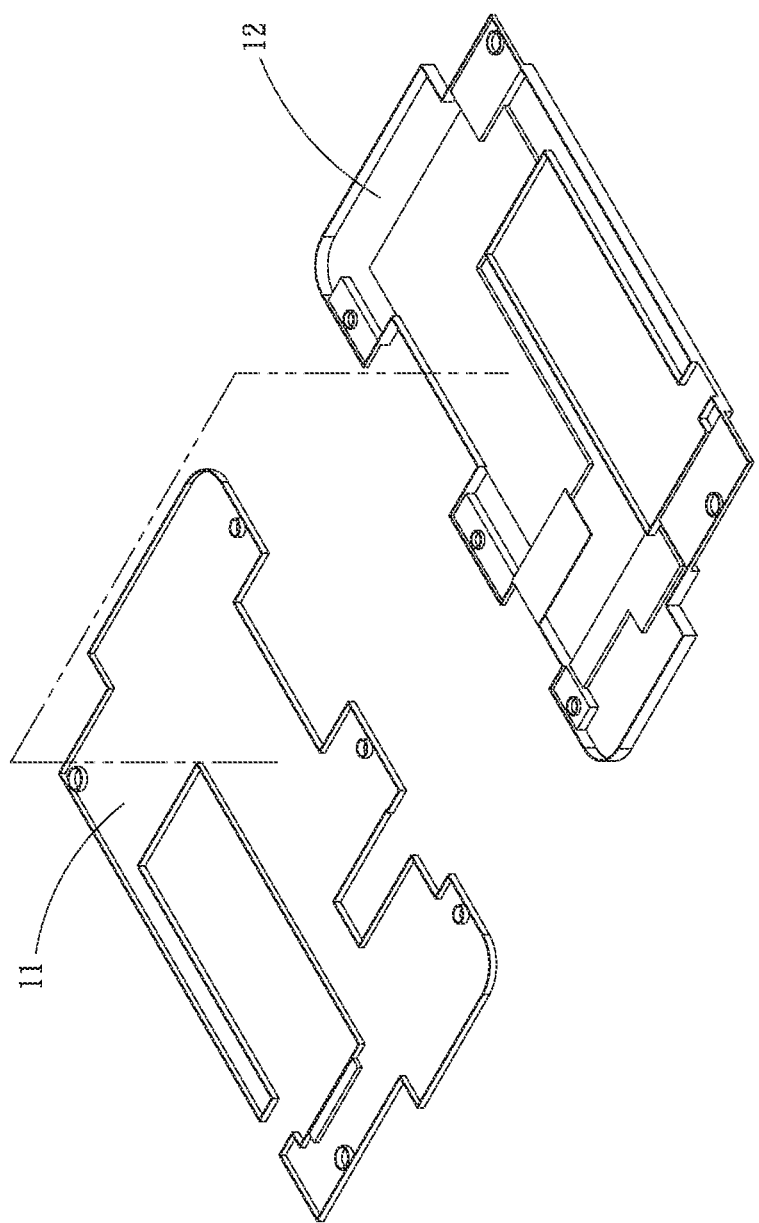
FIG. 1A is a perspective exploded view of a preferred embodiment of the heat dissipation structure of the present invention.

The embodiments of the present invention will be described hereinafter with reference to the drawings, wherein the same components are denoted with the same reference numerals.

Figure 1B:
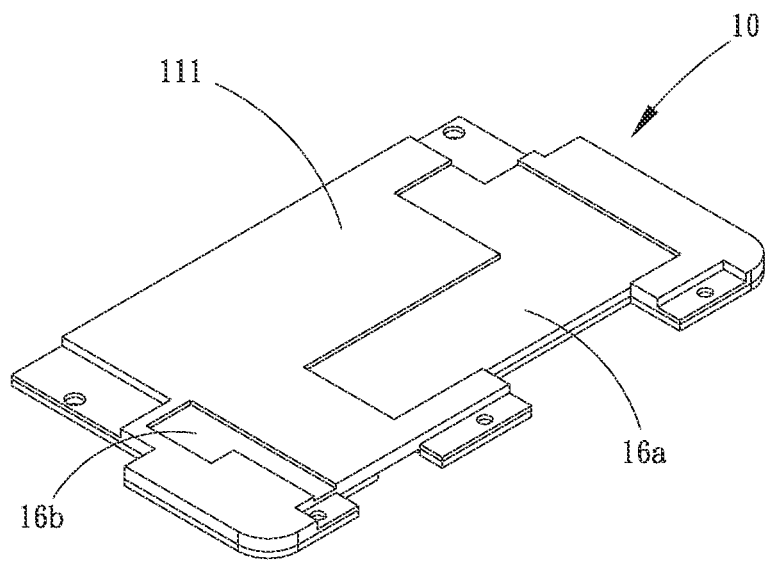
FIG. 1B is a perspective exploded view of the preferred embodiment of the heat dissipation structure of the present invention, showing the first face of the heat conduction support body.
Figure 1C:
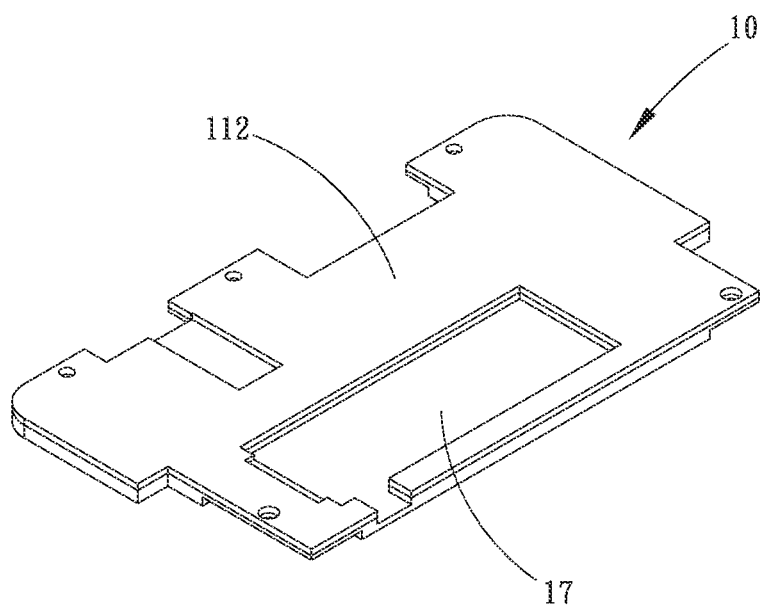
FIG. 1C is a perspective exploded view of the preferred embodiment of the heat dissipation structure of the present invention, showing the second face of the heat conduction support body.
Figure 1D:
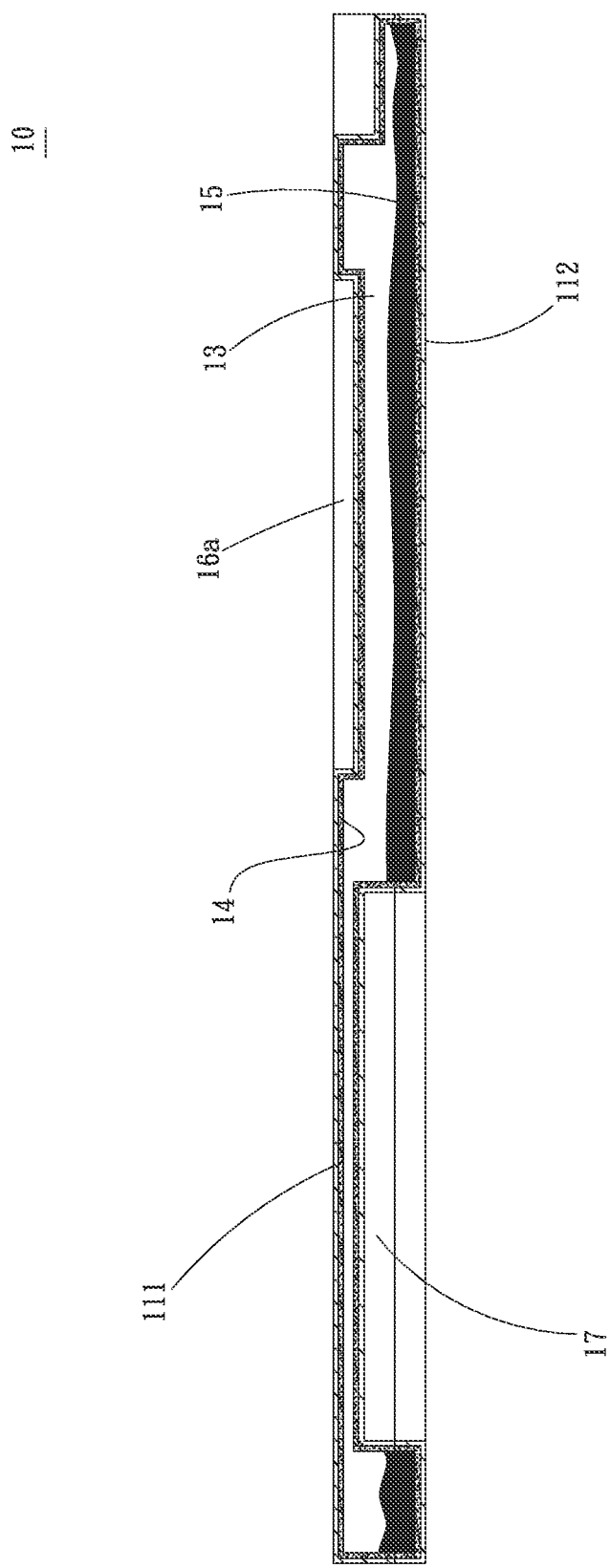
FIG. 1D is a sectional view of the heat conduction support body of the present invention.

Please refer to FIGS. 1A, 1B, 1C and 1D. FIG. 1A is a perspective exploded view of a preferred embodiment of the heat dissipation structure of the present invention. FIG. 1B is a perspective exploded view of the preferred embodiment of the heat dissipation structure of the present invention, showing the first face of the heat conduction support body. FIG. 1C is a perspective exploded view of the preferred embodiment of the heat dissipation structure of the present invention, showing the second face of the heat conduction support body. FIG. 1D is a sectional view of the heat conduction support body of the present invention. According to the preferred embodiment, the heat dissipation structure of the present invention includes a heat conduction support body 10. The heat conduction support body 10 is a vapor chamber or a thin heat pipe. In this embodiment, the heat conduction support body 10 is a vapor chamber for illustration purposes. The heat conduction support body 10 is composed of an upper board body 11 and a lower board body 12 mated with each other. The heat conduction support body 10 has a first face 111 and a second face 112 opposite to the first face 111. A closed chamber 13 is defined between the first and second faces 111, 112. More than one capillary structure 14 and a working fluid 15 are disposed in the chamber 13. The upper and lower board bodies 11, 12 are made of metal material with good thermal conductivity, such as copper or aluminum. The capillary structure 14 is formed on an inner surface of the chamber 13. The capillary structure 14 is selected from a group consisting of channeled structure, metal mesh body and metal powder sintered body. The working fluid 15 is, for example, pure water. In addition, a plurality of support bodies (not shown) can be disposed in the chamber 13.

At least one depression 16a, 16b with a necessary shape and size is disposed on the first face 111 and/or the second face 112 of the heat conduction support body 10. The depression 16a, 16b is formed on a predetermined section of the surface of the upper board body 11 and the surface of the lower board body 12 by means of metal press or milling or grinding. In this embodiment, the depression 16a, 16b is positioned on the first face 111 for contacting a corresponding electronic component in a handheld electronic device. Accordingly, the heat generated by the electronic component can be conducted to the working fluid 15 in the heat conduction support body 10 to phase-change the working fluid 15 and transfer the heat to the second face 112 for dissipating the heat. One of the first and second faces 111, 112 of the heat conduction support body 10 is in corresponding contact with a housing of the handheld electronic device. In this embodiment, the second face 112 is in contact with the housing. Accordingly, the heat transferred to the second face 112 will be conducted to the housing and then dissipated outward. The heat conduction support body 10 is mounted in the handheld electronic device so that the second face 112 can be formed with a battery cavity 17 for receiving a battery in the handheld electronic device.

The application of the heat conduction support body 10 to the handheld electronic device will be described in detail hereinafter. The handheld electronic device can be a mobile phone (including intelligent mobile phone), tablet, PDA, display or an intelligent watch. In this embodiment, the handheld electronic device is an intelligent mobile phone for illustration purposes.

Figure 2A:
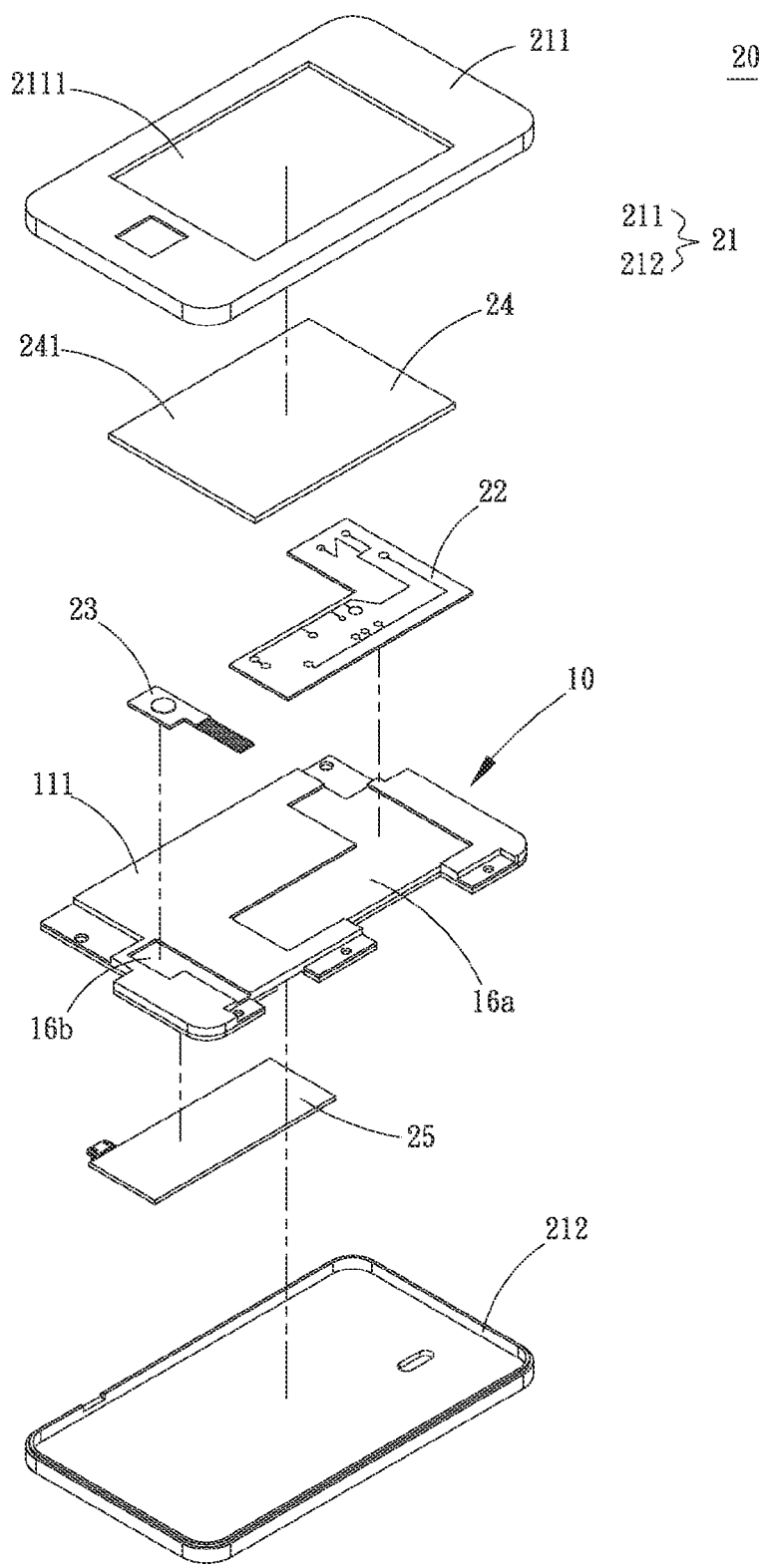
FIG. 2A is a front perspective exploded view of the handheld electronic device with the heat conduction support body of the present invention.
Figure 2B:
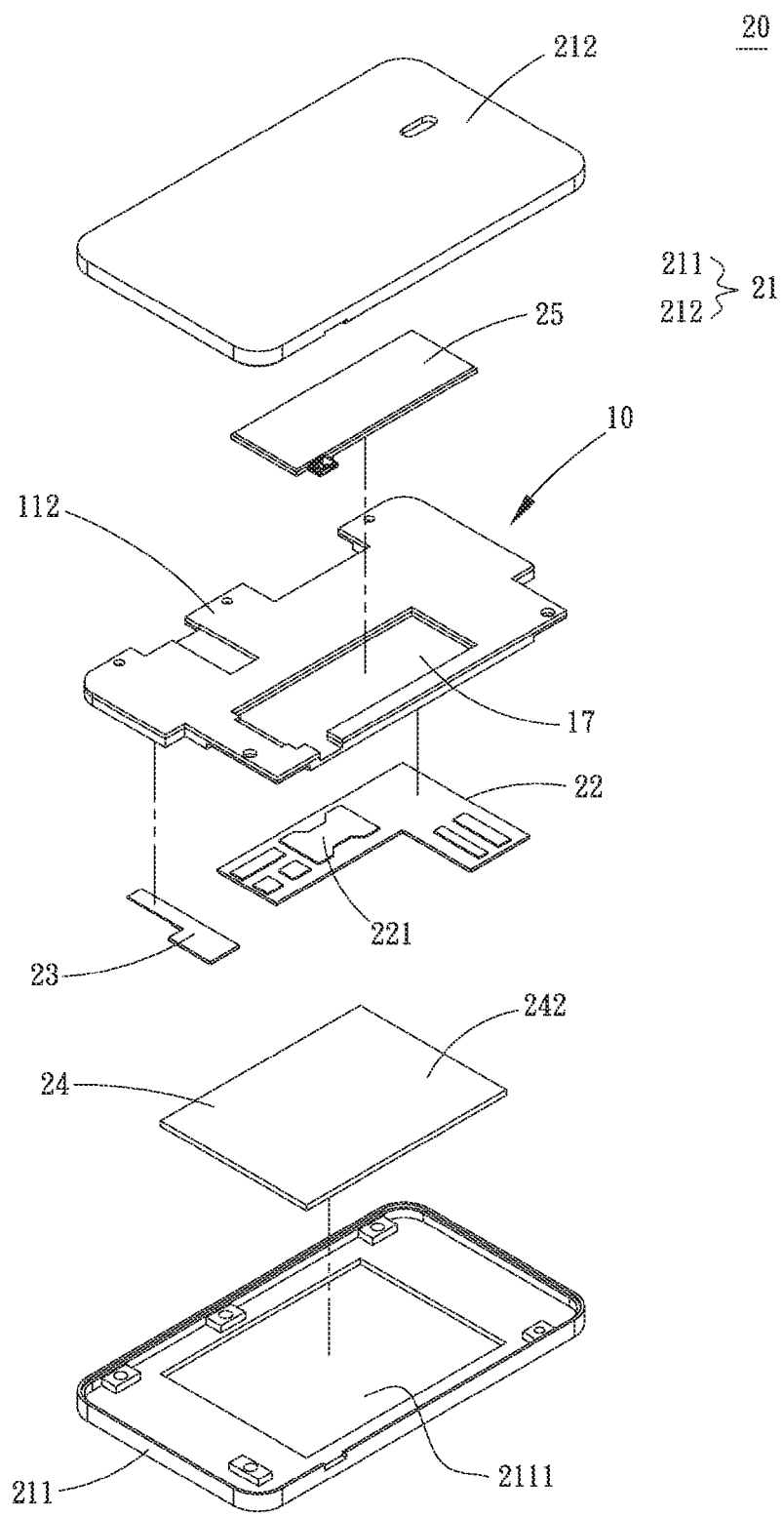
FIG. 2B is a rear perspective exploded view of the handheld electronic device with the heat conduction support body of the present invention.
Figure 2C:
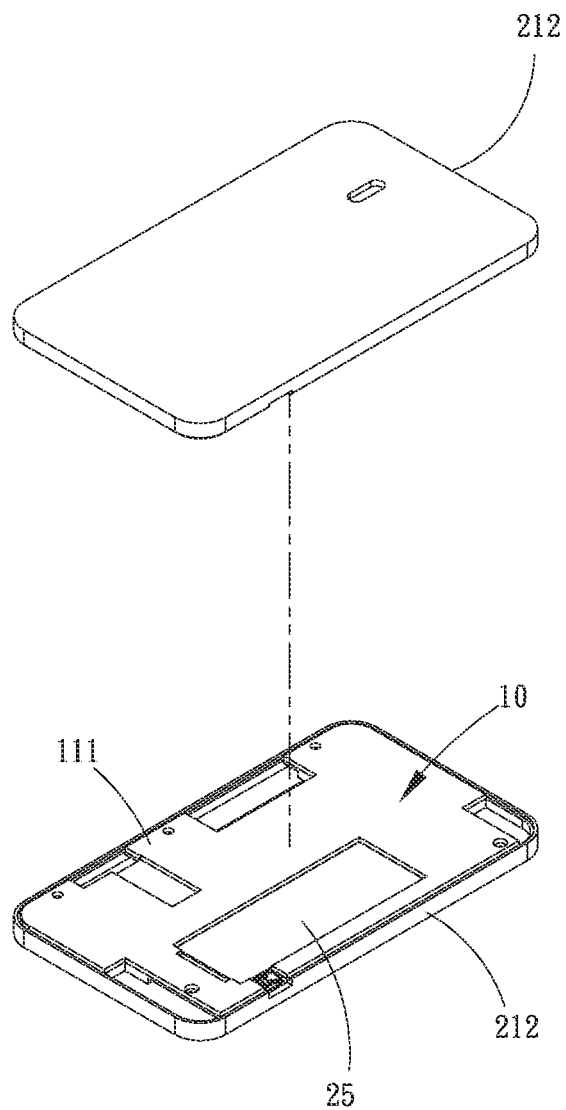
FIG. 2C is a perspective assembled view showing that the heat conduction support body is assembled with the electronic components of the handheld electronic device.
Figure 3:
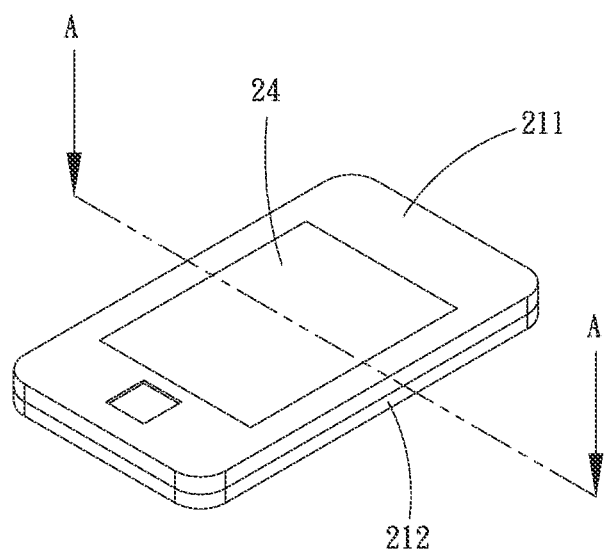
FIG. 3 is a front perspective assembled view of the handheld electronic device with the heat conduction support body of the present invention.
Figure 4:
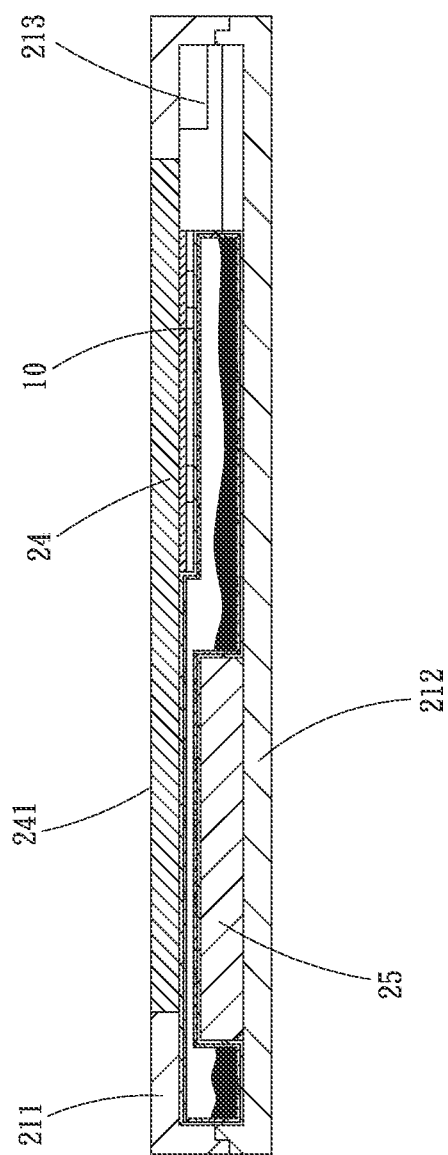
FIG. 4 is a sectional view taken along line A-A of FIG. 3.

Please now refer to FIGS. 2A to 4. FIG. 2A is a front perspective exploded view of the handheld electronic device with the heat conduction support body of the present invention. FIG. 2B is a rear perspective exploded view of the handheld electronic device with the heat conduction support body of the present invention. FIG. 2C is a perspective assembled view showing that the heat conduction support body is assembled with the electronic components of the handheld electronic device. FIG. 3 is a front perspective assembled view of the handheld electronic device with the heat conduction support body of the present invention. FIG. 4 is a sectional view taken along line A-A of FIG. 3.

As shown in FIGS. 2A to 2C and 3 and 4, the handheld electronic device 20 with the heat conduction support body of the present invention includes a housing 21 composed of an upper cover 211 and a lower cover 212. The upper and lower covers 211, 212 define therebetween a space 213. The upper cover 211 is formed with a window 2111 in communication with the space 213. A plurality of electronic components 22, 23, a display screen 24, a battery 25 and the heat conduction support body 10 are received in the space 213. The display screen 24 has a display face 241 and a back face 242. The display screen 24 is mounted in a position near the upper cover 211 with the display face 241 in alignment with the window 2111 of the upper cover 211. The heat conduction support body 10 is mounted on the back face 242 of the display screen 24 with the first face 111 in contact with the back face 242 of the display screen. The electronic components 22, 23 are disposed in the depressions 16a, 16b of the first face 111. In this embodiment, the electronic component 22 is a circuit board on which a plurality of electronic components 221 (including chips, resistors and capacitors) are arranged. One face of the electronic components 221 is in contact with the heat conduction support body 10.

The second face 112 of the heat conduction support body 10 corresponds to the lower cover 212. When the lower cover 212 is assembled with the upper cover 211, the lower cover 212 is in contact with the second face 112 of the heat conduction support body 10. The battery 25 is received in the battery cavity 17 of the heat conduction support body 10. Therefore, when opening the lower cover 212, the second face 112 and the battery 25 are first seen, while the electronic components 22, 23 disposed on the first face 111 are concealed. Accordingly, the heat conduction support body 10 serves as a protection cover for the electronic components 22, 23.

The heat generated by the electronic components 22, 23 and the display screen 24 is conducted to the heat conduction support body 10 to make the working fluid 15 in the chamber 13 phase-change, whereby the heat is transferred from the first face 111 to the second face 112 and then transferred from the second face 112 to the back cover 212 to be dissipated outward.

In conclusion, the heat conduction support body 10 of the present invention is applicable to various handheld electronic devices such as mobile phone, tablet, PDA and digital display. In this case, the handheld electronic device is free from any additional heat dissipation component so that the thickness of the handheld electronic device will not be increased. The heat conduction support body 10 is able to quickly conduct the heat generated by the electronic components inside the handheld electronic device to other sections thereof. Therefore, the heat will not accumulate in the handheld electronic device and can be quickly conducted and dissipated outward.

The conventional vapor chamber or heat spreader is attached to the heat-generating component. Under such circumstance, the thickness of the plastic support will lead to increase of the total thickness of the handheld electronic device. In contrast, in the present invention, the heat conduction support body is formed of the vapor chamber or the thin heat pipe instead of the plastic support in the handheld electronic device. Therefore, the thickness of the handheld electronic device will not be increased. In this case, the handheld electronic device is thinner and the heat conduction efficiency thereof is enhanced.

The present invention has been described with the above embodiments thereof and it is understood that many changes and modifications in the above embodiments can be carried out without departing from the scope and the spirit of the invention that is intended to be limited only by the appended claims.

What is claimed is:

1. A mid frame with heat dissipation applicable to a handheld electronic device, the handheld electronic device having a housing in which a plurality of internal electronic components are arranged, the mid frame having a first face and a second face opposite to the first face, a closed heat-dissipating chamber being defined between the first and second faces, a capillary structure and a working fluid being disposed in the chamber, one of the first and second faces or both of the first and second faces having a plurality of depression portions positioned to accommodate and directly contact a full area of corresponding internal electronic components of the handheld electronic device.

2. The mid frame with heat dissipation as claimed in claim 1, wherein the electronic components are arranged on one of the first and second faces or both of the first and second faces.

3. The mid frame with heat dissipations as claimed in claim 1, wherein one of the first and second faces is in direct contact with the housing of the handheld electronic device.

4. The mid frame with heat dissipation as claimed in claim 1, wherein the mid frame is a vapor chamber or a thin heat pipe.

5. A handheld electronic device, comprising:
a housing composed of an upper cover and a lower cover, the upper and lower covers defining therebetween a space;
a mid frame with heat dissipation disposed in the space between the upper cover and the lower cover, the mid frame having a first face and a second face opposite to the first face, a chamber being defined between the first and second faces, a capillary structure and a working fluid being disposed in the chamber, a plurality of depression portions formed on one of the first and second faces or both of the first and second faces; and
a plurality of internal electronic components positioned in the space of the housing, wherein the full areas of the internal electronic components are accommodated and directly contacted with one of the first and second faces or both of the first and second faces.

6. The handheld electronic device with the heat dissipation structure as claimed in claim 5, wherein one of the first and second faces is in contact with the housing of the handheld electronic device.

7. The handheld electronic device with the heat dissipation structure as claimed in claim 5, wherein the heat conduction support body is a vapor chamber or a thin heat pipe.

8. The handheld electronic device as claimed in claim 5, further comprising a display screen received in the space, the display screen having a display face and a back face, the back face of the display screen being in contact with the mid frame.

* * * * *